United States Patent [19]
Rojey

[11] Patent Number: 5,998,681
[45] Date of Patent: *Dec. 7, 1999

[54] PROCESS FOR PREVENTING THE FORMATION OF A SOLID PHASE FROM HYDROCARBONS IN A FLUID

[75] Inventor: Alexandre Rojey, Rueil Malmaison, France

[73] Assignee: Institut Francais du Petrole, Rueil Malmaison, France

[ * ] Notice: This patent is subject to a terminal disclaimer.

[21] Appl. No.: 08/555,292

[22] Filed: Nov. 8, 1995

[30] Foreign Application Priority Data

Nov. 8, 1994 [FR] France .................................. 94 13517

[51] Int. Cl.⁶ .............................. C07C 9/00; F17D 1/16; B01D 35/06
[52] U.S. Cl. ............................ 585/15; 585/950; 585/953; 137/13; 210/695; 208/370
[58] Field of Search ..................................... 585/950, 953, 585/15; 137/13; 210/695; 208/370

[56] References Cited

U.S. PATENT DOCUMENTS

| | | | |
|---|---|---|---|
| 4,135,387 | 1/1979 | Benedict . | |
| 4,876,018 | 10/1989 | Karydas | 137/13 |
| 4,945,937 | 8/1990 | Scribner . | |
| 5,052,491 | 10/1991 | Harms et al. | 210/695 |
| 5,432,292 | 7/1995 | Sloan, Jr. | 585/15 |
| 5,453,188 | 9/1995 | Florescu et al. | 210/695 |
| 5,625,178 | 4/1997 | Rojey | 204/157.15 |

FOREIGN PATENT DOCUMENTS

| | | |
|---|---|---|
| 0380194 | 8/1990 | European Pat. Off. . |
| 2044794 | 10/1980 | United Kingdom . |

OTHER PUBLICATIONS

Database WPI, Derwent Publications Ltd., London, GB, AN 75–33861W, Nov. 1974.

*Primary Examiner*—Walter D. Griffin
*Assistant Examiner*—In Suk Bullock
*Attorney, Agent, or Firm*—Antonelli, Terry, Stout & Kraus, LLP

[57] ABSTRACT

A process for preventing the formation of a solid phase from hydrocarbons and water in a fluid is disclosed. A physical disturbance is transmitted to the fluid intermittently in time to prevent the formation of crystalline bonds in the fluid.

25 Claims, 3 Drawing Sheets

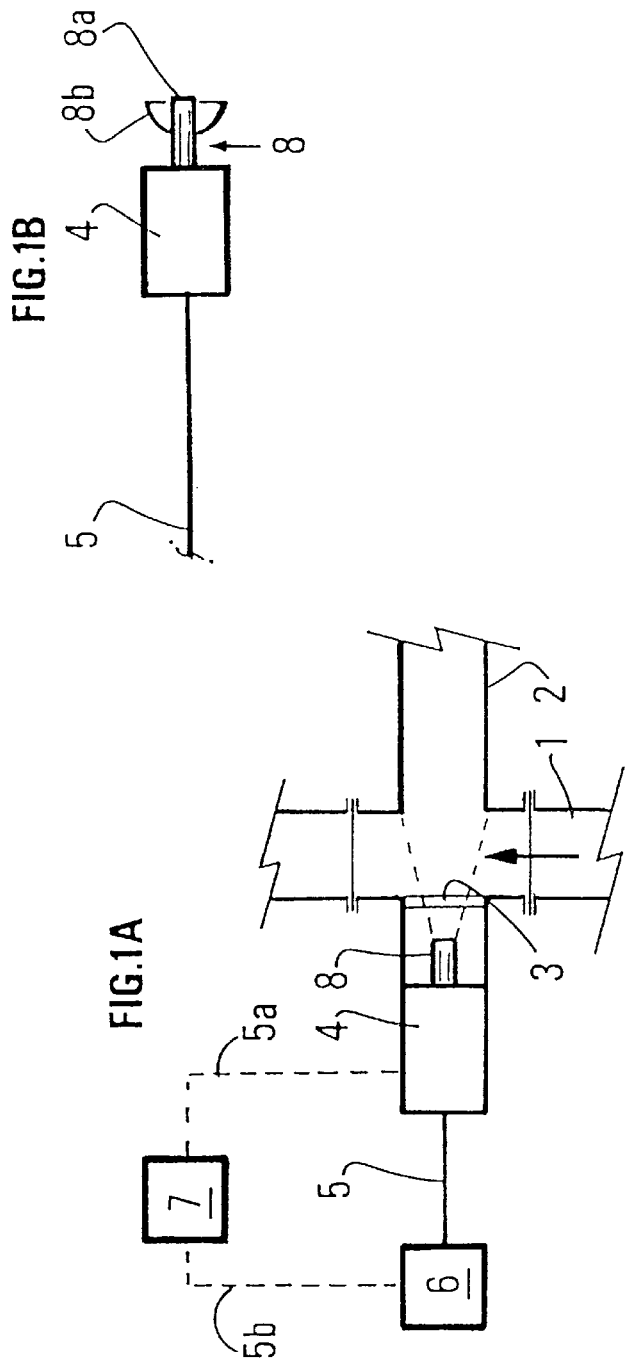
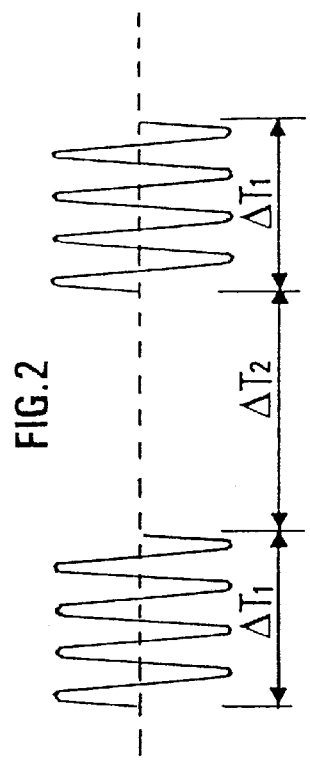
FIG.1A
FIG.1B
FIG.2

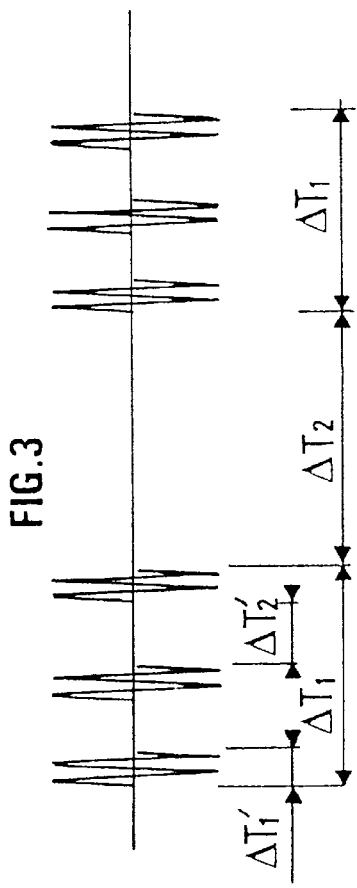
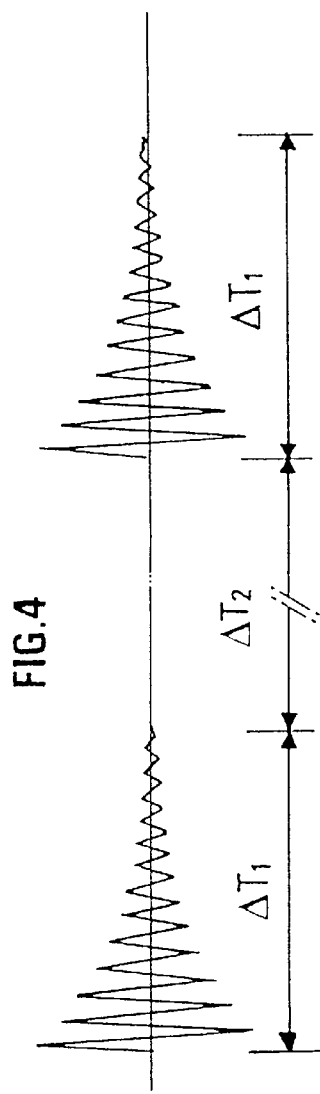
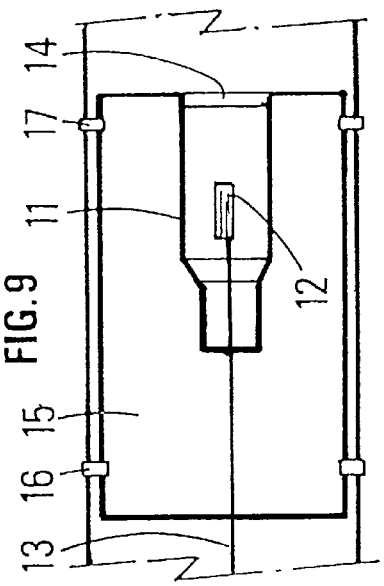
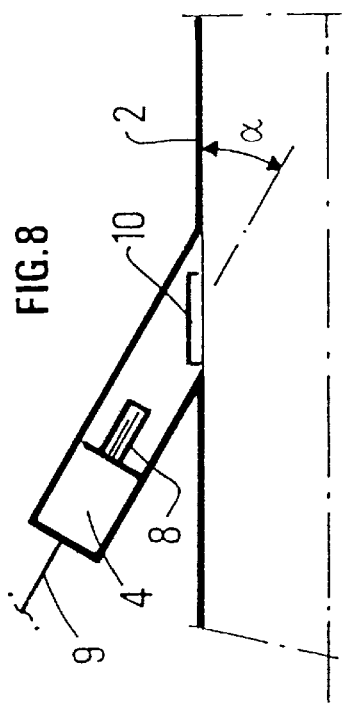

PROCESS FOR PREVENTING THE FORMATION OF A SOLID PHASE FROM HYDROCARBONS IN A FLUID

BACKGROUND OF THE INVENTION

The present invention relates to a process and to a system for inhibiting the formation of crystalline bonds and preventing the formation of a solid phase notably in a fluid comprising several phases of different natures, by subjecting the fluid to a physical disturbance.

The present invention notably applies fields where fluids evolve in time and form at least a solid phase and/or crystals as a function for example of external conditions to which they are subjected, such as temperature and pressure conditions.

The present invention can advantageously be applied to prevent the formation of hydrates, notably light hydrocarbon hydrates, such as natural gas hydrates, petroleum gas hydrates or hydrates of other gases in a fluid.

DESCRIPTION OF THE PRIOR ART

Hydrates can form when water is present in light hydrocarbons, either in the gas phase or dissolved in a liquid phase, such as a liquid hydrocarbon, and when the temperature reached by the mixture becomes lower than the thermodynamic hydrate formation temperature, this temperature a being given for a given gas composition and pressure value.

In order to decrease the production cost of crude oil and of gas, on the investment level as well as on the operating cost level, it can be considered, for example in the case of offshore production, reducing the or even eliminating of the processings applied to the crude oil or to the gas to eliminate water therein that is to be transported from the reservoir to the coast, and notably it is describable to leave all or part of the water in the fluid to be transported. The effluents are thus transferred in the form of a multiphase flow by means of a pipe to a processing platform. This procedure is particularly advantages when offshore production is performed in a area. However, this process has a notable drawback owing to the risk of formation of hydrates due to the presence of water in the effluents.

In fact, oil effluents containing a gas phase and a liquid phase can be made up for example of a condensate gas or an associated gas mixed with crude oil. They are generally saturated with water and can even contain free water in some cases.

When these effluents are transported at the sea bottom, it may happen that, as a result of the lowering of the temperature of the effluent produced, the thermodynamic conditions are likely to promote the formation of hydrates which agglomerate and block the transfer lines. The sea bottom temperature can be low, for example of the order of 3 to 4° C.

The cooling of such an effluent can lead to the formation of hydrates which are inclusion compounds, the water molecules congregating to form cages in which light hydrocarbon molecules, for example methane, ethane, propane, isobutane are trapped. Some acid gases present in natural gas, such as carbon dioxide or hydrogen sulfide, can also form hydrates in the presence of water.

Conditions promoting the formation of hydrates can also be encountered in the same way on land for lines buried only a short distance from the ground surface, when for example the temperature of the ambient air is rather low, notably in northern areas such as the arctic zones.

The agglomeration of hydrates causes the filling and the blocking of the transfer lines as a result of the formation of plugs which prevent the passage of crude oil or of gas and can lead to a production stop that is often quite long because the decomposition of the hydrates formed is very difficult to achieve and therefore brings about considerable financial losses.

In order to avoid such drawbacks, various methods are described in the prior art.

A process intended to remove the water can be carried out on a surface platform situated in proximity to the reservoir, so that the effluent, initially warm, can be processed before the hydrate formation conditions occur on account of the cooling of the effluent with the sea water. This solution however requires bringing the effluent back up to the surface prior to transferring it towards a main processing platform and to have an intermediate processing platform.

The transfer line for transporting the effluent can be insulated or even heated by means of an appropriate device, such as the device described in patent application WO-90/05,260, in order to prevent too fast a cooling of the fluids being transported. However, such devices are costly and complex in their technical realization.

Patent HU-186,511 teaches that an electromagnetic wave having selected frequency values and propagation modes can be sent out to make the formed hydrates melt.

Patent SU-442,287 teaches to use of an ultrasonic wave break the hydrate crystals and to free the trapped gas thereby.

It is also well know to add permanently additives inhibiting the formation of hydrates or paraffins, or to reduce them in the dispersed form. However, such a technique is costly.

The methods described in the prior art haven notable drawbacks notably on account of the high energy values necessary to disperse the hydrate crystals or the solid phases already formed and/or of the use of costly products which often have to be separated.

SUMMARY OF THE INVENTION

The present invention aims to propose a more simple and more economical means to prevent the formation of a solid phase in an oil and/or gas effluent, this solid phase can consist of hydrates and/or paraffins and/or asphaltenes.

It has been discovered, that it is possible to prevent the formation of crystals that can appear in a fluid comprising several phases, by subjecting the fluid to a physical disturbance that prevents a well-ordered arrangement of the water molecules from being established in the fluid, that can lead to the formation of crystalline bonds at least partly responsible for the formation of crystals.

It is thus possible to control and to inhibit the formation of crystalline bonds by means of an appropriate selection of the parameters of the physical disturbance in the fluid, of its form and of its emission sequence.

In fact, by sending out a physical disturbance such as a wave having an appropriate frequency, form and/or emission sequence, to a fluid likely to form hydrates, such as a mixture of water and gas, the water molecules are vibrated so as to prevent the formation of hydrogen bonds. By hindering or by preventing the organization of the water molecules in a crystal lattice that can trap hydrocarbons and form hydrates, the formation of hydrates in a fluid can be prevented.

The present invention relates to a process preventing the formation of a solid phase from hydrocarbons present in a fluid by subjecting the fluid to a physical disturbance so as to induce a disturbance in the fluid in order to vibrate the molecules and to prevent their organization and the formation of crystalline bonds.

The physical disturbance can be provided intermittently in time, in the form of pulses and/or of wave trains.

According to an embodiment of the process, an amplitude-modulated wave can be provided.

The presence of a solid phase in the fluid can be detected and the parameters of the physical disturbance can be determined from these measurements and/or its emissions can be determined and the emission of the physical disturbance can be regulated.

The wave can be an ultrasonic wave and its frequency value may range for example between 10 and 100 KHz.

The fluid flows in a pipe and the wave beam is for example emitted in a direction that is substantially close to the longitudinal axis of the pipe.

the fluid is flowing and the wave can also be emitted in a direction that is substantially close to the direction of flow of the effluent. The wave is emitted for example from an emitter situated in the vicinity of a production wellhead.

When the fluid flows in a pipe, the physical disturbance can also be emitted with an emission axis forming an angle with the longitudinal axis of the pipe that is less than 45° and preferably less than 30°.

The physical disturbance can also be emitted from an emitter situated on a mobile device in the pipe.

The present invention further relates to a system for preventing and/or for controlling the formation of a solid phase in a fluid in a pipe containing at least an aqueous phase and hydrocarbons. The system can comprise at least one emission device for emitting a physical disturbance such as a wave, at least one means for measuring thermodynamic parameters, and a control and monitoring device allowing generation of signals for managing the emission of the electromagnetic wave.

The system according to the invention relates to an emission device comprising a reflector whose shape is suited for distributing the wave substantially over the whole section of the pipe.

The system can comprise one or several emission devices arranged outside a pipe with the axis of each of the emission devices forming an angle that is less than 45°.

The system can comprise a mobile device in the pipe serving as a support for the emission device.

The process according to the invention is advantageously used for inhibiting the formation of hydrates in a fluid containing hydrocarbons with less than five carbon atoms and water.

According to another embodiment of the process, the process is applied to prevent the formation of hydrates in a condensated gas or in an associated gas and a crude oil or in a fluid containing at least a liquid, hydrocarbon, phase in which hydrocarbons likely to form hydrates are dissolved.

This method is also applied to prevent the formation of an asphaltene deposit in a fluid containing a heavy hydrocarbon fraction and to prevent the formation of a paraffin deposits in a fluid containing a paraffinic crude oil.

The process according to the invention has notable advantages consequent from the simplicity of the device and of the low energy which is used.

In fact, the hydrogen bond is mainly responsible for the formation of the crystal lattice comprising water molecules that act as a hydrocarbon tap during the hydrate formation process. This bond is a low-energy bond whose formation can be prevented by vibrating the water molecules, notably by sending out a physical disturbance emitted intermittently in time.

Selection of the emission sequence and the form of the wave emitted thus contributes to minimizing the energy used to destroy hydrate crystals already formed in a fluid by having a "preventive" effect on the crystal or solid phase formation phenomenon and no longer on the crystals themselves. In some cases, it also allows to maintain the effects of the disturbance in the multiphase effluent.

Another advantage of the invention results from the use of the pipe in which the fluid flows as a waveguide. The propagation of the waves in the pipe is thus optimized whatever the shape of the pipe, and the wave beam can then follow changes of direction or accidents, such as bends, in the pipe.

BRIEF DESCRIPTION OF THE DRAWINGS

Other features and advantages of the invention will be clear from reading the description hereafter given by way a non limitative example, with reference to the accompanying drawings in which:

FIGS. 1A and 1B illustrate a basic device according to the invention, and the details of the means for emitting a physical disturbance;

FIGS. 2, 3 and 4 show form and emission sequence examples of the physical disturbance in the form of wave trains;

FIGS. 8 shows a particular arrangement of wave emitters; and

FIG. 9 shows a mobile wave emitting device in a pipe.

DESCRIPTION OF THE PREFERRED EMBODIMENTS

Figure 5:
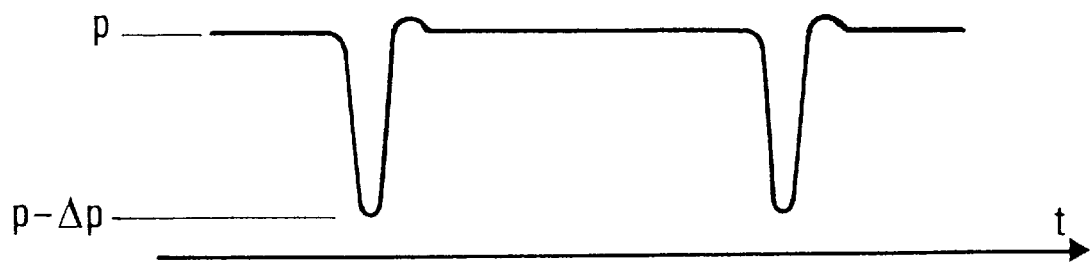
FIGS. 5, 6 and 7 illustrate another example of emission of the physical disturbance and an associated device.

The process and the device according to the invention are based on the bringing into vibration, by means of a physical disturbance, the molecules in a fluid to prevent the formation of preferential chemical bonds and to prevent the formation of a solid phase and/or crystallization therein. It is thus possible to control at least partly crystal nucleation and germination phenomena in a fluid. The physical disturbance is for example sent out intermittently in time.

In order to better define the invention, the description given hereafter by way of a non limitative example relates to the use of a wave beam for inhibiting the formation of hydrogen bonds mainly responsible for the formation of hydrate in a fluid likely to form crystals resulting from the gathering of water molecules acting as hydrocarbon taps, such as an oil type multiphase effluent flowing in a pipe of circular section, for given thermodynamic conditions.

FIG. 1A illustrates an example of a device for performing the process according to the present invention.

Production effluents coming from a reservoir (not shown in the figure) pass through a flowline 1 connected to a transfer pipe 2 of circular section for example, intended to convey the effluent towards a main processing station. Line 1 is provided with a window 3 which is transparent to the physical disturbance that can come for example in the form of a wave or a wave beam. A device such as a wave generator is positioned for example opposite and behind window 3, preferably in line with transfer pipe 2, so that the emission direction of the wave beam coincides substantially with the longitudinal axis of the pipe. The wave generator includes for example an emitter 4 connected, by means of a cable 5, to a voltage source 6 and an antenna 8 radiating the wave beam through window 3 towards the effluent flowing in transfer pipe 2. The emitter and the voltage source 6 are connected by links 5a, 5b to a control and monitoring device 7 whose purpose is to control and to monitor the wave generation.

The waves emitted can be of different types, such as pressures waves, acoustic waves, thermal waves and other waves whose distinctive feature is that they generate a physical disturbance in a fluid or effluent in order to prevent the organization of water molecules in a lattice acting as a gas trap and leading therefore to the formation of hydrates in a fluid.

The waves are advantageously emitted prior to the formation and/or to the aggolomeration of hydrates, so as to prevent partly or totally the formation of crystalline bonds, and the radiation emission time can be managed by means of parameter measurements and possible of models or data previously stored in the microcontroller.

The frequency value of the waves emitted is selected for example as a function of the nature of the effluent and of the thermodynamic conditions to which the effluent is subjected.

For ultrasonic waves, the frequency value of such waves ranges for example between 10 and 100 KHz.

The form and the emission sequence of the waves is selected as a function of the nature of the effluent and notably of the energy necessary to break the crystalline bonds responsible for the formation of the solid phase that can hinder the flow of the effluent in the pipe.

The pulses emitted can thus for example be sent out at closer intervals if the water content increases in the sub-cooling is noticed, i.e., for a given pressure, in the difference between the temperature prevailing in the flow and the temperature corresponding to the thermodynamic equilibrium.

FIGS. 2, 3, 4, 5 and 6 show several examples of possible forms and emission sequences of the wave beam transmitted in the pipe.

The system according to the invention is advantageously equipped with a control for controlling and for measuring thermodynamic parameters, such as pressure detectors Cp and temperature detectors Ct (not shown in the figure) positioned judiciously, for example in places of he pipe where the formation probability of a solid phase such as hydrates is high, in order to monitor continuously, in real time, the thermodynamic conditions and/or the pressure drops under which the effluent transportation is achieved. Such a monitoring notably allows adapting of the parameters of the waves emitted, such as the frequency value or the form and the emission times of these waves in the effluent, as a function of these measurements.

By means of the measurements provided by pressure detector Cp, taken for example between two places of the pipe, it is possible for example to foresee the formation and/or the agglomeration of hydrates and to regulate the parameters of the wave beam emitted to prevent the formation of crystalline bonds and therefore the formation of a solid phase. Such measurements also allow the evolution in time of the hydrate formation to be monitored if need be.

The parameters to be regulated are for example the energy, the frequency of the radiation emitted for controlling the bringing into vibration of the water molecules present in the effluent and for preventing the formation of hydrogen bonds, and/or the form and emission sequence of the wave beam.

These detectors are connected to the control and monitoring device 7, for example by means of a non physical link identical to the links used for remote transmission. Device 7 can be a microcomputer suited for acquiring signals coming from the detectors and/or for generating control signals, and equipped with data processing softwares. It receives the measurements from temperature and pressure detectors Ct and Cp for example and determines therefrom the parameters of the waves to be sent out and possibly the emission times of these waves, for example as a function of the real thermodynamic conditions measured.

The management of the wave emission, the time when the radiation is emitted and its sequence, as well as its parameters, can take into account for example models describing the formation of solid phases, such as hydrates, previously stored in the microcontroller.

FIG. 1B shows in detail an example of a wave emitting device 4 connected to a wave emission antenna 8 that can consist of a waveguide 8a and of a reflector 8b whose shape is suited to obtain for example a substantially homogeneous distribution of the wave beam over the whole section of pipe 2. The wave radiation thus has an effective action on the whole of the effluent circulating in pipe 2. This shape is preferably substantially parabolic and distributes the waves over the whole of the effluent, in the center of the pipe as well as on the inner walls of the pipe.

In some cases, it can be necessary to concentrate the waves towards the walls of the pipe that are generally critical points promoting the formation of hydrates. The shape of the reflecting element positioned behind the antenna is then selected to send out the wave beam preferentially towards the critical points or lower points.

Window 3 is made from a material exhibiting a low attenuation coefficient for the wave emission frequencies used, capable of protecting the antenna from all types of attacks, notably chemical attacks when the effluent is an oil type effluent, and advantageously withstanding high pressures.

The physical disturbance sent out in a fluid can have different forms and be sent out in different sequences described in accordance with FIGS. 2, 3, 4, 5 and 6.

The physical disturbance has notably the effect of preventing the formation of well-ordered lattices acting as hydrocarbon molecules traps when the necessary temperature and pressure conditions are met.

It has been discovered that it is not necessary to exert this action continuously and that the emission of a physical disturbance intermittently in time is sufficient to control crystal nucleation and germination phenomena so as to inhibit the formation of crystalline bonds and the growth of hydrate crystals. This also applies in cases where the setting up of bonds likely to generate asphaltenes and/or paraffins are to be prevented.

For a physical disturbance coming in the form of a wave or of a wave beam, the time interval between two successive wave trains is selected notably as a function of the formation kinetics of a solid phase, for example hydrate crystals.

This time interval can thus be such that the nucleation and germination phenomena responsible for the formation of crystals do not have the time to occur and to evolve sufficiently to generate crystals.

FIG. 2 illustrates a physical disturbance having the form of an ultrasonic wave or ultrasound emitted in the form of wave trains.

In this example, identical wave trains are emitted during a time interval $T_1$, two successive wave trains being separated by a time interval $T_2$. The emission duration $T_1$ of a wave train can range for example between 1/10th and 10 seconds, the time interval $T_2$ ranging for example between 10 and 100 seconds.

Each wave train can be emitted discontinuously in time. FIG. 3 schematizes a wave train subdivided in to several wave trains or elementary wave trains. A wave train has a total emission duration for example substantially equal to $T'_1$, and each of the elementary wave trains has an emission duration for example equal to $T'_1$, two successive elementary wave trains being separated for example by a time interval $T'_2$. The emission duration $T'_1$ of an elementary wave train ranges for example between 1/100th of a second and 1 second, the time interval $T'_2$ separating two elementary wave trains ranging for example between 1/10th of a second and 10 seconds.

This procedure consisting in breaking up the ultrasonic waves can be carried out several times, i.e. be repeated in time by subdividing for example each emission interval or emission duration $T'_1$ into shorter emission intervals $T''_1$ shorter than interval $T'_1$, and these emission intervals can themselves be separated by intervals $T''_2$ shorter than interval $T'_2$.

The total emission duration of the ultrasounds can thus represent only a very short fraction of the time during which the emission operation is carried out, and this fraction can range for example between 1/1000th of the total time and 1/100th.

The average power emitted has thus the advantage of being lower than the peak power of a wave, which allows increasing the scope and the efficiency of the process while limiting the energy expended for inhibiting the formation of a solid phase.

The same principle can be applied in the case of other wave forms, for example electromagnetic waves.

In this case, the values of the emission durations $T_1, T_2$ range respectively between 1/100th and 1/10the of a second, and 1/10th and 1 second, and the values of the emission durations $T'_1$, $T'_2$ range respectively between 1/1000th and 1/100th of a second and 1/100th and 1/10th of a second.

Other wave forms can be used. FIG. 4 illustrates an example of a wave beam sent out in the form of wave trains similar to the description given above, the wave being amplitude-modulated.

The wave trains is for example amplitude-modulated for the whole emission duration $T_1$, so as to obtain a wave heaving a decreasing amplitude in time.

Without departing from the scope of the invention, it is also possible to modulate the amplitude of a wave train over only part of its emission duration.

The ultrasonic waves emitted in the form of wave trains have for example frequency values ranging between 10 and 100 KHz.

According to another embodiment, not shown, it is possible to frequency-modulate the wave trains.

Figure 6:
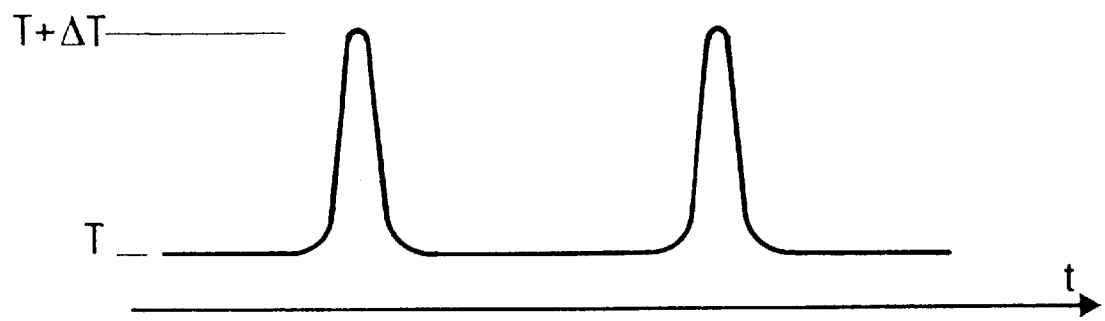

FIGS. 5 and 6 illustrate another example of the process according to the present invention which uses a pressure or a temperature disturbance to cause a physical disturbance in the effluent.

According to FIG. 5, several short-duration pressure disturbances including pressure decreases are propagated in the pipe. The pressure disturbances shown in FIG. 5 are generated for example by using a pressure-regulating device usually present in effluent transportation devices and systems, whose purpose is notably to control the pressure value at which the effluent transportation is achieved. A pressure drop pΔp is created during a time interval that can be for example of the order of some seconds by bringing the steady state pressure value p to the pressure p-Δp, the pressure variation Δp being of the order of several bars for example. These disturbances, that are propagated in the pipe at a speed substantially close to the speed of sound, can be separated by time intervals of the order of multiple time intervals each of ten seconds.

It is also possible to use short-duration temperature disturbances.

FIG. 6 illustrates such a disturbance. During a given time interval, the working temperature T is varied for example by causing a temperature increase T of the order of ΔT Celsius degrees, until a temperature value T+ΔT is reached.

The thermal waves created thereby can be propagated in the pipe by means of a convection effect notably due to the flow of the fluid in the transfer pipe.

Figure 7:
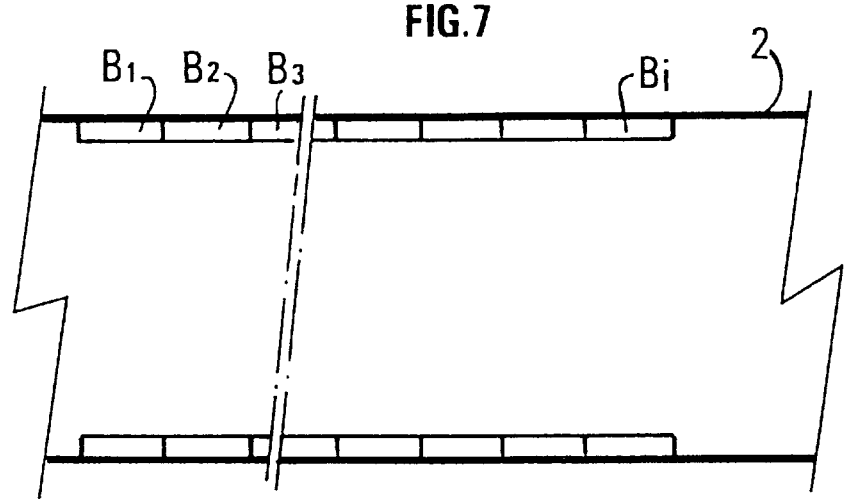

In such a case, it can be preferable to maintain this thermal wave and/or its propagation in the transfer pipe, for example with the aid of a complementary or auxiliary heating device described in conjunction with FIG. 7.

The device includes, for example inside and on part of transfer pipe 2, electric windings $B_1, B_2 \ldots, B_i$, arranged so as to heat the fluids circulating in the pipe by the Joule effect. These windings are sequentially current-fed so that, at a given time, only a fraction of the windings is fed, this faction ranging for example between 1/100 and 1/10, but so that each of the windings is current-fed sequentially during the corresponding time fraction.

The methods described above in connection with FIGS. 1 to 7 thus apply, without departing from the scope of the invention, to the prevention of the formation of solid phases such as paraffin and/or asphaltene deposits.

The advantage of such physical disturbance or wave forms and of such physical disturbance emission sequences is notably that the value of the energy used can be adapted to the fluid concerned and, on the other hand, owing to their discontinuous feature, they promote the propagation of the physical disturbance in the pipe.

In some cases, for example according to the nature of the physical disturbance, the propagation of this disturbance in the fluid can be optimized by means of the material of the pipe, its geometry and its dimension.

Such a device works for example as follows: The microcontroller 7 sends an emission order to voltage source 6 and an emission order to emitter 4. The emission order is sent to the voltage source at predetermined times corresponding to the emission sequence of the physical disturbance selected. When this disturbance is a wave beam, the latter is thus sent out according to a predetermined sequence, for example, as a function of hydrate formation prediction models previously stored in the microcontroller and/or as a function of the pressure and temperature measurements obtained by means of the devices Cp and Ct situated along the pipe, and transmitted to microcontroller 7 for example with the aid of remote transmission device. The wave beam emission order is advantageously sent prior to the formation of hydrates. It is thus possible to vary continuously, or in real time, the form and the emission sequence of a wave by taking account of the transportation conditions and of their evolution in time.

The wave emitted by antenna 8 is propagated in the oil effluent by interacting with the motion of the molecules of the fluids circulating in the pipe and it has more particularly the effect of vibrating the water molecules, of preventing the formation of hydrogen bonds and of avoiding thereby the organization of these molecules in a crystal lattice.

According to an advantageous embodiment of the invention, illustrated in FIG. 8, it is possible to position several wave emitters all along pipe 2 conveying the effluent. This on intrusive embodiment is particularly well suited for pipes of great length.

Emitter 4 is for example positioned outside the pipe and so arranged that the wave emission direction or axis forms, with the longitudinal axis of the pipe, an angle alpha that is less tan 45° and preferably less than 30°.

Wave emitter 4 is connected by a cable 9 to a power supply (not shown) the and to microcontroller 7. The wave beam radiated by antenna 8 is transmitted to the effluent circulating in pipe 2 through the window 10 placed on the periphery of pipe 2 with an angle of emission substantially close to 30°. The radiation emitted is substantially homogeneous and uniform over the whole surface of the emission antenna.

The space between the emitter and the pipe can be filled with a material preferably identical to that constituting the emitter. The losses observed during the transmission of the waves to the effluent circulating in pipe 2 are minimized thereby.

The distance between two emitters is for example determined as a function of the nature of the effluent to be transported and/or of the transportation conditions. The emitters are for example positioned all along the pipe at regular intervals, the length of an interval ranging for example between 1 and 10 km.

FIG. 9 shows a particular embodiment of the invention in which the wave emitter is positioned on a mobile device 15 in pipe 2, for example on a scraper commonly used in oil industry for cleaning pipes.

Such a layout allows the optimizing the effect of the wave beam emitted onto the effluent, notably without being hindered by possible problems of attenuation of the waves during their propagation in certain effluents.

Scraper 15 is for example set in motion by means of the pressure of the effluent circulating in pipe 2 and guided by scraper rings 16, 17. It includes, in the front, a wave emitter 11 connected for example to a voltage source by a cable 13. Cable 13 can be placed on a spooler and unwinds as the scraper advances in the pipe. An antenna 12 of a type identical to antenna 4 radiates the waves in the effluent flowing in the pipe. As in FIG. 1A, the antenna can have a shape suited for transmitting the waves over the whole section of the pipe. The waves thus reach all of the flow, the center and the inner walls of the pipe.

The instants when the scraper is set in motion can be deduced from the temperature and pressure measurements obtained by means of detectors Ct and Cp or by means of prediction models previously stored in the microcontroller.

Without departing from the scope of the invention, the wave emitting device can be positioned in the neighborhood of a production wellhead, the emission axis of the antenna being directed substantially in line with the well, so as to inhibit the formation of hydrates in the well.

The number of wave emitting devices can be selected as a function of the shape of the pipe. It is advantageously possible to increase the number of emitters in places of the pipe exhibiting geometrics that favor the formation of hydrates so as to intensify the effects of these waves.

Without departing from the scope of the present invention, it is possible to emit simultaneously different wave forms and/or to combine the emission sequences of different wave forms.

The direction of propagation of the waves can be identical to the direction of flow of the fluid circulating in the pipe but, in some cases, they can be emitted in an opposite direction to the direction of flow. The latter configuration allows, notably in the case of a sea pipe connecting for example an offshore production station to an onshore terminal, to place the wave emitting device onshore.

The various means allowing the generation of a physical disturbance in a fluid described above can be associated with each other or with other means. It is thus possible to emit simultaneously waves of different natures so as to intensify their action.

According to another implementation variant of the process according to the invention, the emission of waves can be associated with the use of chemical additives commonly used to prevent the formation of hydrates, whose purpose is to inhibit hydrates, in order to increase the efficiency of such additives and/or to decrease their concentration.

For example certain polymers may be used to prevent the nucleation, the germination and/or the growth of hydrate crystals.

It has also been proposed to use certain surfactants to facilitate the dispersion of hydrate crystals in a liquid hydrocarbon phase. Certain solvents or certain salts are also known for their inhibiting properties.

By associating these inhibitors with the send out of a wave allowing a physical disturbance to be generated in a fluid as described above, it is possible to reduce the consumption of these additives and therefore to decrease the cost of the processing to prevent the blocking of the pipe in which the fluid flows by a hydrate plug.

I claim:

1. A process for preventing a formation of a solid phase from hydrocarbons present in a fluid flowing in a pipe, which comprises at least a step of: subjecting the fluid in the pipe to a physical disturbance which vibrates molecules in the fluid and prevents organization of the molecules in the fluid and the formation of crystalline bonds in the fluid that produce the formation of the solid phase in the pipe; and wherein the physical disturbance is sent out intermittently in time in the form of pulses and/or wave trains.

2. The process of claim 1 in which an amplitude-modulated wave is sent out.

3. The process of claim 1, wherein the presence of a solid phase in the fluid is detected and the parameters of the physical disturbance are determined from these measurements and/or emission times are determined and the emission of the physical disturbance is regulated.

4. The process of claim 1, wherein an ultrasonic wave is sent out.

5. The process of claim 4, wherein the value of the frequency of said wave ranges between 10 and 100 KHz.

6. The process as claimed in claim 1, wherein the fluid is flowing and the wave beam is emitted in a direction substantially close to the longitudinal axis of the pipe.

7. The process as claims in claim 1, wherein the fluid is flowing and wave is emitted in a direction substantially close to the direction of flow of the effluent.

8. The process of claim 1, wherein the fluid is flowing in a pipe and the physical disturbance is emitted along an emission axis forming an angle with the longitudinal axis of the pipe that is less than 45°.

9. The process of claim 1, wherein the fluid is flowing in a pipe and the physical disturbance is emitted from at least one emitter situated on a mobile device in the pipe.

10. The process of claim 1 comprising inhibiting the formation of hydrates in a fluid containing hydrocarbons with less than five carbon atoms and water.

11. The process of claim 1 comprising inhibiting the formation of hydrates in a condensate gas or in an associated gas and a crude oil or in a fluid containing at least a liquid hydrocarbon phase in which hydrocarbons are likely to form hydrates are dissolved.

12. The process of claim 1 comprising: inhibiting the formation of an asphaltene deposit in a fluid containing a heavy hydrocarbon fraction.

13. The process of claim 1 comprising: inhibiting the formation of a paraffin deposit in a fluid containing a paraffinic crude oil.

14. The process in accordance with claim 2 wherein:
the amplitude-modulated wave is an ultrasonic wave.

15. The process of claim 3, wherein an ultrasonic wave is sent out.

16. The process of claim 6, wherein an ultrasonic wave is sent out.

17. The process of claim 7, wherein an ultrasonic wave is sent out.

18. The process of claim 8, wherein an ultrasonic wave is sent out.

19. The process of claim 9, wherein an ultrasonic wave is sent out.

20. The process of claim 10, wherein an ultrasonic wave is sent out.

21. The process of claim 11, wherein an ultrasonic wave is sent out.

22. The process of claim 12, wherein an ultrasonic wave is sent out.

23. The process of claim 13, wherein an ultrasonic wave is sent out.

24. The process of claim 1, wherein the fluid is flowing in a pipe and the physical disturbance is emitted along an emission axis forming an angle with the longitudinal axis of the pipe that is less than 30°.

25. The process of claim 24, wherein an ultrasonic wave is sent out.

* * * * *